Oct. 20, 1936.  E. R. KOPPEL  2,057,721

MILLING MACHINE

Filed June 22, 1934  3 Sheets-Sheet 1

INVENTOR.
ERNEST R. KOPPEL
BY
ATTORNEY.

Oct. 20, 1936.  E. R. KOPPEL  2,057,721
MILLING MACHINE
Filed June 22, 1934  3 Sheets-Sheet 2

INVENTOR.
ERNEST R. KOPPEL
BY J. R. McCrady
ATTORNEY.

Oct. 20, 1936.  E. R. KOPPEL  2,057,721
MILLING MACHINE
Filed June 22, 1934  3 Sheets-Sheet 3

INVENTOR.
ERNEST R. KOPPEL
BY
ATTORNEY.

Patented Oct. 20, 1936

2,057,721

UNITED STATES PATENT OFFICE

2,057,721

MILLING MACHINE

Ernest R. Koppel, South Bend, Ind., assignor to Bendix Products Corporation, South Bend, Ind., a corporation of Indiana Application June 22, 1934, Serial No. 731,853

16 Claims. (Cl. 90—15)

This invention relates to milling machines and more particularly to that type of machine in which a plurality of cutting elements are employed to simultaneously operate upon the same piece of work.

Machines of this general type have been known in the past, but their operation has not been very satisfactory where the element operated upon was comparatively small or where irregularity of the shape of the piece or of the nature of the cut necessitated the movements of the cutting element in three planes.

One type of work wherein the above difficulties are encountered is that of forming the ball races of a universal joint of the constant angular velocity type such as that disclosed in Weiss Patent 1,522,351 granted January 6, 1925.

The machine may however be used in other types of work where similar difficulties are encountered.

Briefly this invention comprises a novel arrangement of the cutting elements and the driving elements therefor, so that the cutter may be moved in three planes as the milling operation progresses.

One of the principal features of the invention resides in the novel positioning of the driving elements so that the piece operated upon may be held stationary while the driving elements progressively move about the work so as to produce any desired combination or variation of cuts on the work.

Another feature of the invention resides in the provision of means whereby a plurality of pieces may be operated upon simultaneously by different cutting elements where the work is of such a nature that there is insufficient clearance to permit of the use of a plurality of cutting elements operating simultaneously upon one piece.

A further object of the invention is to provide an improved cutting element which may be sharpened periodically as the cutter wears or becomes dull due to service.

Other novel features of this invention will be more apparent from the following detailed description together with the accompanying drawings. It is understood, however, that the drawings are submitted for purposes of illustration only, and are not intended to define the scope of the invention, reference being had for that purpose to the subjoined claims.

In the drawings, wherein similar reference characters refer to similar parts throughout the several views.

Figure 1:
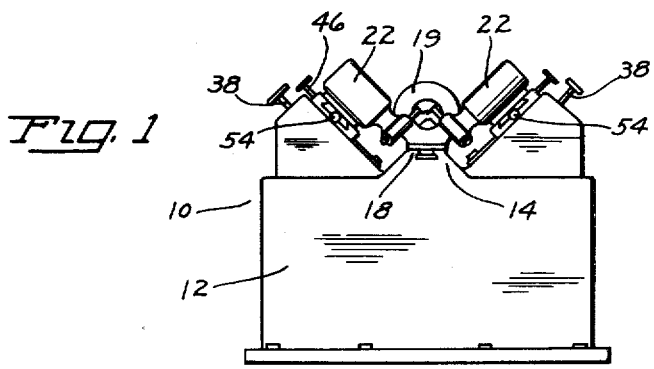
Figure 1 is a front elevation of the machine having a universal joint member in operating position.
Figure 2:
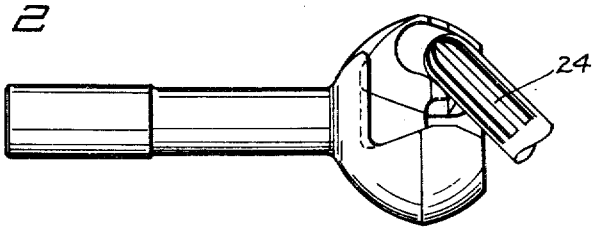
Figure 2 is a view showing a universal joint member with a cutting element in operating position.

Referring to the drawings, and more particularly to Figure 1, there is shown a milling machine 10 having a base member 12. The base 12 is provided with a W-shaped top or cover. The central portion 14 provides a space to receive an electric motor 16 or other power device, and also provides a support 18 for a fixture 19 to hold the piece to be operated upon. This fixture 19 may be of the dial type which allows for a loading station adjoining the sides of the raised central portion of the cover. The side portions 20 of the cover are supports which receive electric motors 22 or other power units. The motors 22 are provided with variable reduction gearing mechanism through which the power is transmitted to a plurality of milling cutters 24 which operate upon the piece to be formed.

The work to be operated upon is held in a fixture 19 which slides on and is clamped to the top of the support 18. Provision is made for the longitudinal adjustment of the work by means of the T-shaped slot 28 and the bolt 26, so that the work may be moved longitudinally to any desired position and then clamped down. The longitudinal adjustment of the work is represented by the distance D in Figure 3, and is the distance the center of the cutter is removed from the center of the ball joint on the longitudinal axis of the piece.

The feed or speed of the cut is obtained by varying the position of the self-contained drive including the cutting elements 24 with respect to the work. This feed mechanism is operated by any suitable type of motor 16 positioned in the central portion 14. The motor 16 operates through a variable position reduction gear comprising a worm gear and worm. The worm drives the worm gear 30 fixed to a shaft 32. The shaft 32 is mounted in a slidable support 34 carried on the under side of the cover portion 20, and has fixed to it an arcuate base plate 36.

Figure 3:
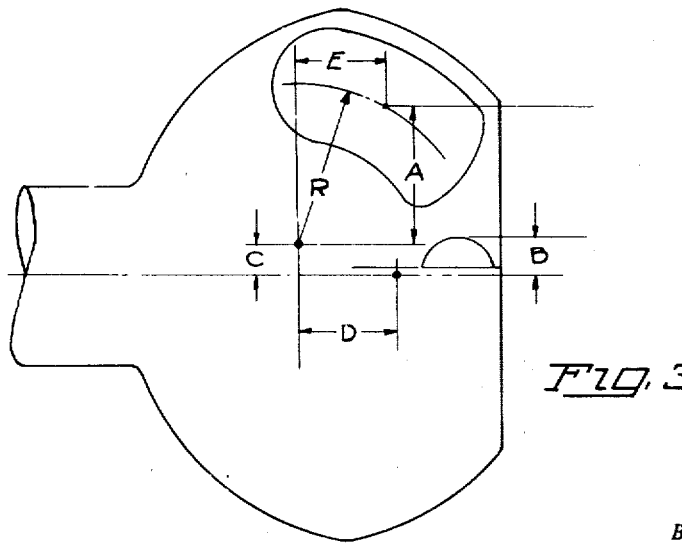
Figure 3 is a diagrammatic view of a universal joint member showing centers and center lines of the formed races.
Figure 4:
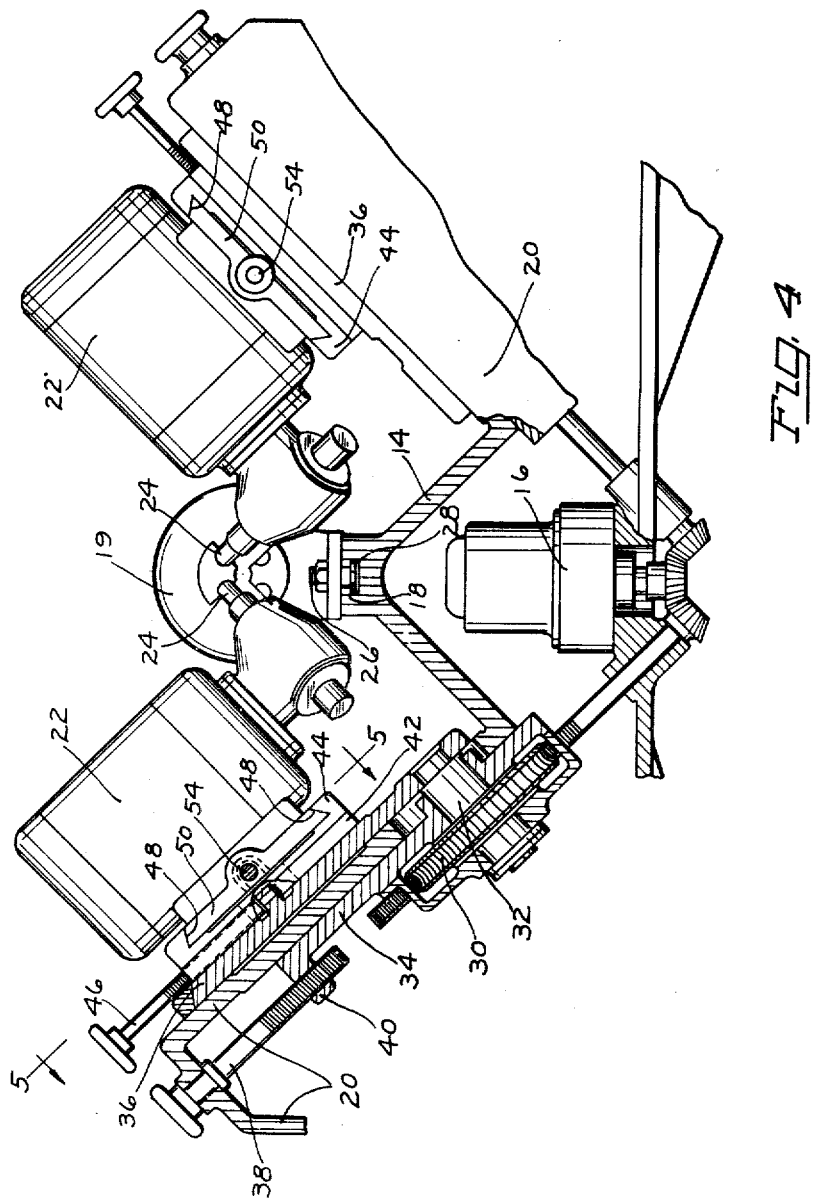
Figure 4 is an elevation partly in section of the upper portion of the machine shown in Figure 1.

A threaded screw 38 having stop members on both sides of the support 20 cooperates with a flanged portion 40 of the member 34 slidably mounted in a groove in the support 20 to move the shaft 32 relative to the work piece. The shaft 32 about which the arcuate plate 36 rotates may thus be moved so as to coincide with the center line of the work, or to vary the distance from that center line by any desired amount. This adjustment is represented in Figure 3 by the distance C. Another method of obtaining suitable adjustments between the center line of the shaft 32 and the center line of the work is to raise or lower the work-holding fixture in suitable slides. In that case the adjusting screw 38 and the carriage 34 may be eliminated. The shaft 32 will then be in one fixed position.

The arcuate base plate 36 is provided with a pair of ways 42 which receive a slide member 44 in sliding relation therewith so that longitudinal movement A (see Figure 3) of the driving elements 22 and the cutters 24 is provided. This longitudinal movement A is adjustably controlled by the lead screw 46 having a hand crank fixed thereto. In case the angle between the center line of the cutter 24 and the radius of the curved race is zero this distance A is equal to R of Figure 3.

Figure 5:
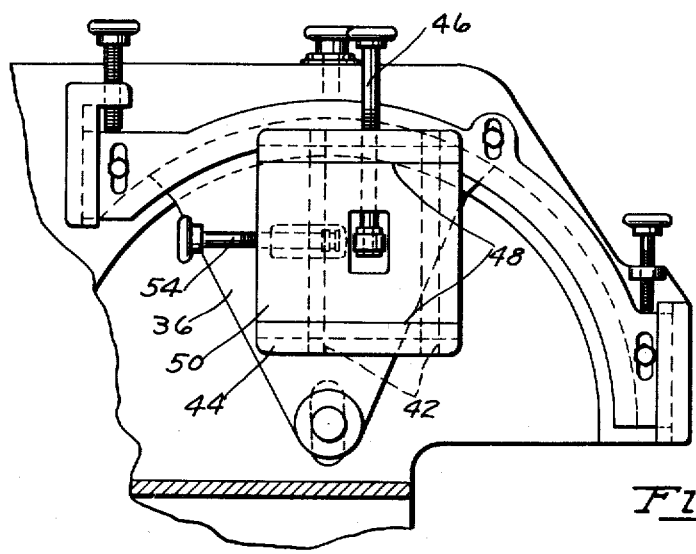
Figure 5 is a view taken on the line 5—5 of Figure 4.

The slide member 44 is also fitted with a pair of ways 48 which receive another slide member 50 supporting the power elements 22 so that the power elements may be moved transversely of the arcuate base plate 36. This movement is controlled by the lead screw 54 having a hand crank fixed thereto. This mechanism is best illustrated in Figure 5, and provides for adjustment of the distance E of Figure 3.

The power elements 22, which if desired may be variable speed electric motors, insure driving the cutting elements at a proper speed to insure that the most efficient results may be obtained on the work and that the cutting elements will not be subjected to too great a strain. If a different type power element is employed a suitable reduction gear mechanism may be interposed to obtain the same result.

Figure 6:
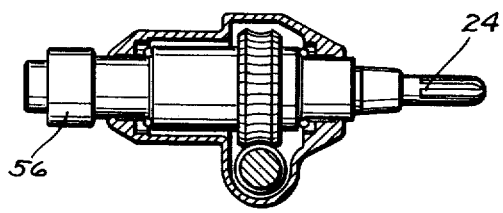
Figure 6 is a detail view of the final feed mechanism, taken on line 6—6 of Figure 4.

The cutter 24 may be adjusted longitudinally, as viewed in Figure 6, by loosening the collar 56, placing the cutter in the desired position and then tightening the collar to clamp the cutter securely in place. This adjustment provides for variation of the depth of the cut and allows for wear of the cutters. It is represented in Figure 3 by the distance B.

The cutter employed is of a constant diameter type so that when it becomes worn due to service it may be taken out of the machine and sharpened. The cutters are longitudinally adjustable so that they may be resharpened several times before they are discarded. This feature makes it unnecessary to replace the cutters when they become worn.

Figure 7:
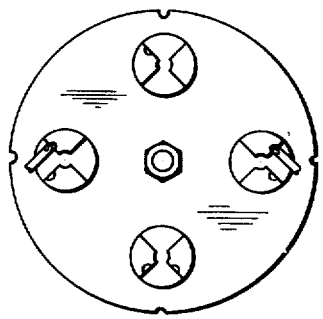
Figure 7 is a view showing the arrangement of parts wherein a plurality of pieces are operated upon simultaneously.

Figure 7 shows a work-holding device which may be employed where there is insufficient distance between the adjacent portions of the piece being operated upon to permit of the use of a plurality of cutting elements operating upon the same piece simultaneously. Figure 7 shows a dial type chuck to which a plurality of pieces may be clamped in such a way as to allow for indexing of the pieces. Separate cutters operate upon two oppositely disposed pieces at the same time until a given operation is completed. When one operation is completed the chuck is indexed and a similar operation is performed upon the other two pieces. In this device the piece remains in the fixture for two complete revolutions and is repositioned after the first complete revolution.

The operation of the machine is as follows. The hand crank of screw 38 is rotated so as to position the center line of the shaft 32 in the proper position with respect to the center line of the work piece, thereby making the adjustment C of Figure 3. The radius of curvature is next adjusted by the hand crank of screw 36, thereby adjusting the distance A of Figure 3. After the cutter has been set at its proper cutting angle, the depth of the cut represented at B of Figure 3 is adjusted by loosening the collar 56, moving the cutter 24 to the desired position and then clamping the cutter in place.

The angle of the cutter in relation to the curve is then adjusted by operating the hand crank of the lead screw 54 to make the adjustment E of Figure 3. The dimensions A and E together result in the cutter being at a distance R from the center of rotation which results in a curvature whose radius is R. These adjustments may be made with gage blocks and while the arcuate plate is in the zero position. That is, the slide 50 must be parallel with the center line of the work piece.

The arcuate plate is then swung to a predetermined starting position to make room for the work piece. The piece to be operated upon is then placed in the fixture 19, moved longitudinally on fixture support slide 18 and when in the proper position represented by D of Figure 3, the fixture is tightened in place by the bolt 26. When the proper adjustments have all been made and the arcuate plate is swung to the starting position, the motors 22 are started to drive the cutters 24. The motor 16 operates to rotate the arcuate base plate 36 thereby moving the cutters along the predetermined path performing the desired work on the piece.

Electric reversing switches may be provided which co-operate with stop members to limit the rotary movement of the arcuate plate and provide means for backing the cutting elements away from the work after a cut has been made. Another stop member is employed to check the rotation of the arcuate base plate 36 when it is returned to the starting position.

In the specific structure shown two races of the joint are finished during each cycle of operation of the machine. When two races have been thus completed the joint member is rotated 180° and the other two races are formed in the same manner.

It will be observed that this machine may be employed to cut the races of a joint having straight races or compound races in which a part of the race is straight and a part of it is curved, as well as the curved races more particularly described above. In order to adapt the machine to the cutting of straight races, it is only necessary to move the arcuate plate 36 to any desired position, lock it there and render the feeding mechanism inoperative. The feed or speed of the cut may then be regulated by moving the slide base 50 in the ways 48 of the member 44 by means of the lead screw 54. A straight cut is thus obtained which has the desired inclined angle with the center line of the work operated upon. If the desired cut is in a horizontal plane the arcuate plate may be set vertically and the feed or speed of the cut may be obtained by moving the fixture which holds the work being operated upon. By combining the movements of the slide base 50, the arcuate plate 36 and the fixture 19 holding the work piece, nearly any desired combination of straight and curved cuts may be obtained on the work. It will be understood, of course, that power means may be employed to actuate the feeding mechanism.

While the invention has been described with reference to a particular embodiment thereof, it is not my intention to limit the scope of the invention to that embodiment, or otherwise, than by the terms of the appended claims.

I claim:

1. A milling machine comprising a work support, a plurality of milling cutters, separate power means for each of the cutters, a rotatable support including arcuate shaped base plate for each of the power means, adjustable means including oppositely disposed ways in the arcuate shaped base plate to permit movement of said power means in either of two directions to vary the radius of curvature and the starting position of the cutters, and means to oscillate the rotatable support to effect the cutting operation.

2. A milling machine having an adjustable work rest, a cutting element operably associated with said work, power means for said cutting element, a rotatable support for said power means, manually operable adjustable means associated with said support to permit movement of said power means in two planes, manually operable adjusting means to move said rotatable support, and means to rotate said rotatable support.

3. A milling machine having an adjustable work rest, a cutting element operably associated with the work, electric motors for the cutting element, a rotatable support for the electric motors, manually operable adjustable means associated with the support to permit movement of the electric motors in two planes, manually operable adjusting means to move the rotatable support, and an electric motor to rotate the rotatable support.

4. A milling machine having main body section, an adjustable work rest, a cutting element, separate power means for said cutting element, adjustable means between the power means and the cutting element, a support for the power means, a member engaging the support, a pair of ways between the support and the member, manually operable means for moving the support with respect to the member, a rotatably mounted arcuate plate engaging the member, a pair of ways between the member and the arcuate plate, manually operable means for moving the member with respect to the arcuate plate, and means to rotate the arcuate plate.

5. A milling machine having main body section, an adjustable work rest, a cutting element, power means for the cutting element, adjustable means between the power means and the cutting element, a support for the power means, a member engaging the support, a pair of ways between the support and the member, manually operable means for moving the support with respect to the member, a rotatably mounted arcuate plate engaging the member, a pair of ways between the member and the arcuate plate, manually operable means for moving the member with respect to the arcuate plate, and means to rotate the arcuate plate, adjustable means between the body section and the arcuate plate, manual means to move the arcuate plate with respect to the body section, ways between the arcuate plate and a portion of the body section, and power means to rotate the arcuate plate.

6. A milling machine having main body section, an adjustable work rest, a cutting element, power means for the cutting element, adjustable means between the power means and the cutting element, a support for the power means, a member engaging the support, a pair of ways between the support and said member, manually operable means for moving the support with respect to the member, a rotatably mounted arcuate plate engaging the member, a pair of ways between the member and the arcuate plate, manually operable means for moving the member with respect to the arcuate plate, and means to rotate the arcuate plate, adjustable means between the body section and the arcuate plate, manual means to move the arcuate plate with respect to the body section, ways between the arcuate plate and a portion of the body section, power means to rotate the arcuate plate, a worm gear fixed to the arcuate plate, a worm operably connected with the worm gear, and power means to rotate the worm.

7. A milling machine having main body section, an adjustable work rest, a cutting element, power means for the cutting element, adjustable means between the power means and the cutting element, a support for the power means, a member engaging the support, a pair of ways between the support and said member, manually operable means for moving the support with respect to the member, a rotatably mounted arcuate plate engaging the member, a pair of ways between the member and the arcuate plate, manually operable means for moving the member with respect to the arcuate plate, and means to rotate the arcuate plate, adjustable means between the body section and the arcuate plate, manual means to move the arcuate plate with respect to the body section, ways between the arcuate plate and a portion of the body section, power means to rotate the arcuate plate, a worm gear fixed to the arcuate plate, a worm operably connected with the worm gear, and means to vary the speed of the worm.

8. A milling machine having a body section, a movable work support, a cutting element, power means for the cutting element, a support for the power means, a member engaging the support, means to move the support with respect to the member, a rotatably mounted arcuate plate engaging the member, means to move the member with respect to the arcuate plate, means to rotate the arcuate plate, means to fix the arcuate plate in any desired position, a body section engaging the arcuate plate, means to move the arcuate plate with respect to the body section, and means to move the work support.

9. A milling machine having an adjustable support adapted to receive a piece of work, a cutting element to operate on the work, movable power means to drive the cutting element, means including a rotatable arcuate plate to support the power means, adjustable means including a pair of oppositely disposed ways between the arcuate plate and the power means, and means to oscillate the arcuate plate to control the feed of the cutting element.

10. A milling machine having an adjustable support adapted to receive a piece of work, a cutting element to operate on the work, movable power means to drive the cutting element, means including a rotatable arcuate plate to support the power means, adjusting means between the cutting element and the arcuate plate, said adjusting means including a pair of manually operable slides movable in ways disposed at an angle to each other to move the cutting element relative to the work, and means to rotate the arcuate plate to control the feed of the cutting element.

11. A milling machine having a work support, a piece of work fixed to the support, a cutting element to operate on the work, a holder for the cutting element, power means to drive the cutting element, means to rotate the holder of the cutting element about an axis perpendicular to the axis of the cutting element to vary the depth of the cut, an oscillating support for the power means, and means to oscillate the support to effect a cutting operation on the work.

12. A milling machine having a work support, a piece of work fixed to the support, a cutting element to operate on the work, a holder for the cutting element, power means to drive the cutting element, means to rotate the holder of the cutting element about an axis perpendicular to the axis of the cutting element, a rotatable support for the power means, means to rotate the rotatable support, and adjustable means between the power means and the rotatable support to permit movement of the power means in either of two directions.

13. A milling machine having a work support, a piece of work fixed to the support, a plurality of cutting elements, separate power means for each cutting element, a rotatable support for each of the power means, adjustable means between the power means and the rotatable support to permit movement of the power means in either of two directions, means to rotate the rotatable support, and means to vary the speed of the rotatable support.

14. A milling machine having an adjustable work rest, a piece of work clamped to the work rest, a longitudinally adjustable cutting element, a support for the cutting element, adjustable means between the cutting element and the support to vary the angle between the cutting element and the work, means including a rotatably mounted arcuate plate adapted to carry said support, means including oppositely disposed ways between support and the arcuate plate to permit movement of the support in two planes, and means to rotate the rotatable support to effect a cutting operation on the work.

15. A milling machine having an adjustable work rest, a piece of work clamped to the work rest, a longitudinally adjustable cutting element, a support for the cutting element, adjustable means between the cutting element and the support to vary the angle between the cutting element and the work, means including a rotatably mounted arcuate plate adapted to carry said support, means including oppositely disposed ways between support and the arcuate plate to permit movement of the support in two planes, and means to move the support to effect a cutting operation on the work.

16. A milling machine having an adjustable work rest, a piece of work clamped to the work rest, a longitudinally adjustable cutting element, a support for the cutting element, adjustable means between the cutting element and the support to vary the angle between the cutting element and the work, means including a rotatably mounted arcuate plate adapted to carry said support, means including oppositely disposed ways between support and the arcuate plate to permit movement of the support in two planes, and means to move the work rest to effect a cutting operation on the work.

ERNEST R. KOPPEL.